Patented July 18, 1950

2,516,024

UNITED STATES PATENT OFFICE 2,516,024

TREATMENT OF IRISH MOSS

Arthur E. Siehrs, Chicago, Ill., assignor to Krim-Ko Corporation, Chicago, Ill., a corporation of Illinois No Drawing. Application May 1, 1946,
Serial No. 666,536

6 Claims. (Cl. 8—101)

1

The present invention involves an unprecedented, extraordinary and unique process for the treatment of marine-plants, more particularly Irish-moss, to render it suitable for certain advantageous employment of its valuable constituents.

The novel procedure stands out as especially original and inventive in view of the many years in which such moss has undergone various treatments to make certain of its inherent properties available for useful employment but without discovery of this novel and useful practice and procedure.

One outstanding and paramount aim or object of the invention is the bleaching or color-modification of the moss in a very simple and relatively inexpensive manner never heretofore known or used so far as history indicates.

The invention includes the finely subdividing of the moss of between about 100 and 200 mesh size and then bleaching this extremely small-size, dry moss by directly exposing a thin layer thereof, say about $\frac{1}{16}$ inch thick, to sunlight for a period of time of approximately two hours in good weather, depending, of course, upon the time of year and the strength and activity of the light, so that the darker pigments in the moss, probably mostly greens, are bleached by the light leaving the more resistant red pigments practically unchanged, the result being the modification in the appearance of the moss from black to a reddish cast.

Strangely enough, this reddish color is not objectionable for the great majority of uses of the moss due to the fact that the red color is sensitive to heat and can be completely, or approximately completely, destroyed or eliminated if the moss is introduced into solution, or is mixed with water, and then heated, the rate of disappearance of the red hue being, as would naturally be expected, proportional to the temperature employed and the duration of the application of the heat.

When whole Irish-moss, as is commonly practiced, is bleached in water or in the presence of moisture, which it must necessarily have to effect the bleaching, the length of time required for the bleaching is so much prolonged over this new accelerated bleaching that the red color disappears at about the same rate as the green or darker colors so that the red coloration is never noticed when the whole moss is bleached in the usual manner of the present day, whereby it has never been possible heretofore to obtain a moss in which the darker colors were removed leaving

2 the red color still in the moss so that the preparation of this finely-ground speedily-bleached moss with the reddish cast is a new article of commerce.

If it is desired, the reddish cast or color may be removed from the black moss prior to its grinding or bleaching, or the product may be sold and used without removing the red color.

As stated before, for an application where the use of heat and water are applied to the moss and wherever the solution in which the moss is to be used is alkaline, the red color will present no trouble because it will completely disappear under those circumstances.

In case it is desired to eliminate or greatly reduce the red color in the black moss before its grinding and bleaching, this may be easily accomplished by mixing the moss, water and sodium carbonate in the approximate proportion of 5 grams of moss, 95 grams of water and 0.5 gram of sodium carbonate and subjecting the same to about 120° Fahr. for about fifteen minutes, such conditions, of course, being subject to reasonable modifications.

The temperature and time period stated seem to be a suitable and satisfactory working condition but, of course, if the moss were more finely ground, more red color would be removed at very probably a shorter period of time.

It seems, however, that the 120° Fahr. is just about the upper limit and that fifteen minutes soaking at this temperature is also about the upper limit for such time.

As stated before, the presence of the red color does not present any major problem and this proposed method of removal during the course of the processing is not necessarily a vital part of the procedure.

Those acquainted with this art will readily understand that the invention as set forth in the appended claims is not necessarily limited and restricted to the precise details set forth hereinbefore and that reasonable modifications may be resorted to without departure from the heart and essence of the invention or the loss of any of its material benefits and advantages.

I claim:

1. The process of making a commercial product by finely subdividing dry, clean, black Irish moss to a size of about 100 to 200 mesh, spreading out such fine dry moss particles in a layer about $\frac{1}{16}$ inch thick, and bleaching it while in that dry condition by exposing it to sunlight and retaining all of the original water-soluble mucilaginous and non-mucilaginous constituents of the moss in the commercial product.

2. The process set forth in claim 1, in which said bleaching is sufficient to change the original black color of the moss particles only to a reddish cast.

3. The process set forth in claim 2, including the additional step of removing the specified reddish cast of the moss by subjecting the treated moss to the action of water and heat.

4. The process of making a commercial product by finely subdividing dry, clean, black Irish moss to a size of about 100 to 200 mesh, spreading out such fine dry moss particles in a layer about $\frac{1}{16}$ inch thick, exposing said moss layer to sunlight for a period to bleach its original black color only to a reddish cast, and removing such reddish cast by the application of water and heat to the moss, the final product containing all of the original water-soluble mucilaginous and non-mucilaginous constituents of the moss.

5. The process set forth in claim 4, in which said water is in the form of a solution of sodium carbonate and said heat is about 120° Fahr.

6. The process set forth in claim 4, in which said reddish cast is removed from the Irish moss by heating the moss in a solution of sodium carbonate in the approximate proportion of 5 grams of moss, 95 grams of water and 0.5 gram of sodium carbonate at a temperature of about 120° Fahr. for a period of about 15 minutes.

ARTHUR E. SIEHRS.

REFERENCES CITED

The following references are of record in the file of this patent:

UNITED STATES PATENTS

| Number | Name | Date |
| --- | --- | --- |
| 113,562 | Rand | Apr. 11, 1871 |
| 742,124 | Martin | Oct. 20, 1903 |
| 1,814,981 | Thornley et al. | July 14, 1931 |
| 2,011,594 | Seltzer | Aug. 20, 1935 |
| 2,163,147 | Le Gloahec | June 20, 1939 |

FOREIGN PATENTS

| Number | Country | Date |
| --- | --- | --- |
| 673 | Great Britain | Feb. 9, 1879 |
| 5,146 | Great Britain | Aug. 7, 1914 |
| 13,433 | Great Britain | Oct. 11, 1884 |

OTHER REFERENCES

Kraemer, "Some Notes on Chondrus," Am. Jour. of Pharmacy, 1899, page 482.